(12) United States Patent
Tati et al.

(10) Patent No.: US 10,929,234 B2
(45) Date of Patent: *Feb. 23, 2021

(54) APPLICATION FAULT TOLERANCE VIA BATTERY-BACKED REPLICATION OF VOLATILE STATE

(71) Applicant: VMware, Inc., Palo Alto, CA (US)

(72) Inventors: Kiran Tati, Fremont, CA (US); Qasim Ali, Santa Clara, CA (US); Wei Xu, Sunnyvale, CA (US); Rajesh Venkatasubramanian, San Jose, CA (US); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/881,480

(22) Filed: Jan. 26, 2018

(65) Prior Publication Data

US 2019/0129814 A1  May 2, 2019

Related U.S. Application Data

(60) Provisional application No. 62/578,323, filed on Oct. 27, 2017.

(51) Int. Cl.
*G06F 11/14* (2006.01)
*G06F 16/27* (2019.01)
*G06F 1/26* (2006.01)
*G06F 11/20* (2006.01)

(52) U.S. Cl.
CPC .......... *G06F 11/1438* (2013.01); *G06F 1/263* (2013.01); *G06F 11/1464* (2013.01); *G06F 11/1471* (2013.01); *G06F 11/1484* (2013.01); *G06F 11/2025* (2013.01); *G06F 16/27* (2019.01); *G06F 2201/805* (2013.01);
(Continued)

(58) Field of Classification Search
CPC ............... G06F 11/1471; G06F 11/203; G06F 11/2041; G06F 11/2043
See application file for complete search history.

(56) References Cited

U.S. PATENT DOCUMENTS 8,953,439 B1 * 2/2015 Lin ..................... G06F 11/1484
370/219
9,164,856 B2 10/2015 Harpaz et al.
9,645,901 B2 5/2017 Nagaraj
(Continued)

OTHER PUBLICATIONS

J. Zhao, O. Mutlu, and Y. Xie. FIRM: Fair and High-Performance Memory Control for Persistent Memory Systems. In International Symposium on Microarchitecture, 2014.
(Continued)

*Primary Examiner* — Jigar P Patel

(57) ABSTRACT

Techniques for implementing application fault tolerance via battery-backed replication of volatile state are provided. In one set of embodiments, a primary host system can detect a failure that causes an application of the primary host system to stop running. In response to detecting the failure, the primary host system can replicate volatile state that is used by the application to a secondary host system, where the secondary host system maintains a copy of the application, and where execution of the application is failed over to the copy on the secondary host system using the replicated volatile state.

21 Claims, 5 Drawing Sheets

(52) U.S. Cl.
CPC ...... *G06F 2201/82* (2013.01); *G06F 2201/84* (2013.01); *G06F 2201/85* (2013.01)

(56) References Cited

U.S. PATENT DOCUMENTS

| | | | |
|---|---|---|---|
| 2002/0143798 | A1 | 10/2002 | Lisiecki |
| 2007/0150760 | A1* | 6/2007 | Nowlin ............... G06F 1/3203 713/300 |
| 2010/0043010 | A1* | 2/2010 | Yokoyama .......... G06F 11/2038 718/105 |
| 2012/0042196 | A1* | 2/2012 | Aron .................. G06F 11/2028 714/4.11 |
| 2013/0067168 | A1 | 3/2013 | Havewala |
| 2014/0115310 | A1* | 4/2014 | Smith ..................... H04L 49/65 713/2 |
| 2014/0201574 | A1* | 7/2014 | Manchek ............ G06F 11/1407 714/38.13 |
| 2014/0325116 | A1* | 10/2014 | McKelvie .......... G06F 12/0246 711/103 |
| 2016/0335006 | A1 | 11/2016 | Rose |
| 2016/0378623 | A1 | 12/2016 | Kumar et al. |
| 2018/0074968 | A1 | 3/2018 | Bk et al. |
| 2018/0095879 | A1 | 4/2018 | Han et al. |
| 2018/0107596 | A1 | 4/2018 | Kelly et al. |
| 2018/0239725 | A1 | 8/2018 | Kumar et al. |
| 2018/0357139 | A1* | 12/2018 | Delgado Campos ....................... G06F 11/2023 |

OTHER PUBLICATIONS

HammerDB benchmark. https://www.hammerdb.coml. Site updated Apr. 2018.
HPE scalable persistent memory. https://www.hpe.com/us/en/servers/persistent-memory.html. Uploaded Aug. 17, 2018.
Intel Xeon processor E7 family: Reliability, availability, and serviceability. https://www.intel.com/content/www/us/en/processors/xeon/xeon-e7-family-ras-server-paperhtml. Copyright 2011.
Micron NVDIMMs: Persistent memory performance. https://www.micron.com/~/media/documents/products/product-flyer/nvdimm\_flyer.pdf. 2016.
Persistent memory programming. http://pmem.io/. Dec. 2017.
NVM programming model (NPM). https://www.snia.org/tech\_activities/standards/cur\_standards/npm. Dec. 2013.
Sysbench benchmark. https://github.com/akopytov/sysbench. Copyright 2018.
Magic quadrant for x86 server virtualization infrastructure. https://www.gartner.com/doc/2788024/magic-quadrant-x-server-virtualization, Jul. 2014 (republished Aug. 2016).
Intel and Micron Produce Breakthrough Memory Technology. New Class of Memory Unleashes the Performance of PCs, Data Centers and More. http://files.shareholder.com/downloads/ABEA-45YXOQ/5284651856x0x841530/7852AA28-4E57-4D8F-A180-FA135F0BC406/Micron-Intel\_Next\_Gen\_NVM\_Press\_Release\_FINAL\_072815.pdf. 2015.
J. Arulraj, A. Pavlo, and S. R. Dulloor. Let's talk about storage & recovery methods for non-volatile memory database systems. In International Conference on Management of Data, pp. 707-722, 2015.
E. Berg and E. Hagersten. StatCache: A probabilistic approach to efficient and accurate data locality analysis. In International Symposium on Performance Analysis of Systems and Software, pp. 20-27, Mar. 2004.
K. Bhandari, D. R. Chakrabarti, and H.-J. Boehm. Makalu: Fast recoverable allocation of non-volatile memory. In Objectoriented Programming, Systems, Languages, and Applications, pp. 677-694, 2016.
H.-J. Boehm and D. R. Chakrabarti. Persistence programming models for non-volatile memory. In International Symposium on Memory Management, pp. 55-67, 2016.
D. R. Chakrabarti, H.-J. Boehm, and K. Bhandari. Atlas: Leveraging locks for non-volatile memory consistency. In Object-oriented Programming, Systems, Languages, and Applications, 2014.
J. Coburn, A. M. Caulfield, A. Akel, L. M. Grupp, R. K. Gupta, R. Jhala, and S. Swanson. Nv-heaps: Making persistent objects fast and safe with next-generation, non-volatile memories. In International Conference on Architectural Support for Programming Languages and Operating Systems, 2011.
Doug Voigt. RDMA requirements for high availability in the NVM programming model. https://www.snia.org/sites/default/files/DougVoigt\_RDMA\_Requirements\_for\_HA.pdf. Storagae Developer Conference, Santa Clara, 2016.
A. Dragojevi'c, D. Narayanan, O. Hodson, and M. Castro. FaRM: Fast remote memory. In Symposium on Networked Systems Design and Implementation, pp. 401-414, 2014.
A. Dragojevi'c, D. Narayanan, E. B. Nightingale, M. Renzelmann, A. Shamis, A. Badam, and M. Castro. No compromises: Distributed transactions with consistency, availability, and performance. In ACM Symposium on Operating Systems Principles, pp. 54-70, 2015.
M. Friedman, M. Herlihy, V. Marathe, and E. Petrank. Brief Announcement: A Persistent Lock-Free Queue for Non-Volatile Memory. In International Symposium on Distributed Computing, vol. 91, pp. 50:1-50:4, 2017.
Intel. 3D XPointTM Unveiled—The Next Breakthrough in Memory Technology. http://www.intel.com/content/www/us/en/architecture-and-technology/3d-xpoint-unveiled-video.html.
Intel. Intel architecture instruction set extensions programming reference. https://software.intel.com/sites/default/files/managed/69/78/319433-025.pdf, pp. 24-104, Jul. 2012.
Viyojit: Decoupling battery and DRAM capacities for batterybacked DRAM. In International Symposium on Computer Architecture, pp. 613-626, Jun. 2017.
A. Kolli, S. Pelley, A. Saidi, P. M. Chen, and T. F. Wenisch. High-performance transactions for persistent memories. In International Conference on Architectural Support for Programming Languages and Operating Systems, pp. 399-411, 2016.
A. Kolli, J. Rosen, S. Diestelhorst, A. G. Saidi, S. Pelley, S. Liu, P. M. Chen, and T. F. Wenisch. Delegated persist ordering. In International Symposium on Microarchitecture, pp. 1-13, 2016.
A. Kolli, V. Gogte, A. G. Saidi, S. Diestelhorst, P. M. Chen, S. Narayanasamy, and T. F. Wenisch. Language-level persistency. In International Symposium on Computer Architecture, pp. 481-493, 2017.
E. Kultursay, M. Kandemir, A. Sivasubramaniam, and O. Mutlu. Evaluating STT-RAM as an energy-efficient main memory alternative. In International Symposium on Performance Analysis of Systems and Software, 2013.
S. Lai. Current status of the phase change memory and its future. In International Electron Devices Meeting, 2003.
B. C. Lee, E. Ipek, O. Mutlu, and D. Burger. Architecting Phase Change Memory As a Scalable DRAM Alternative. In International Symposium on Computer Architecture, 2009.
B. C. Lee, P. Zhou, J. Yang, Y. Zhang, B. Zhao, E. Ipek, O. Mutlu, and D. Burger. Phase Change Technology and the Future of Main Memory. International Symposium on Microarchitecture, 2010.
V. J. Marathe, M. Seltzer, S. Byan, and T. Harris. Persistent memcached: Bringing legacy code to byte-addressable persistent memory. In USENIX Workshop on Hot Topics in Storage, Santa Clara, CA, 2017.
I. Moraru, D. G. Andersen, M. Kaminsky, N. Tolia, P. Ranganathan, and N. Binkert. Consistent, durable, and safe memory management for byte-addressable non volatile main memory. In SIGOPS Conference on Timely Results in Operating Systems, 2013.
S. Nalli, S. Haria, M. D. Hill, M. M. Swift, H. Volos, and K Keeton. An analysis of persistent memory use with whisper. In International Conference on Architectural Support for Programming Languages and Operating Systems, pp. 135-148, 2017.
D. Narayanan and O. Hodson. Whole-system Persistence. In International Conference on Architectural Support for Programming Languages and Operating Systems, pp. 401-410, New York, NY, USA, 2012.

(56) References Cited

OTHER PUBLICATIONS

F. Nawab, J. Izraelevitz, T. Kelly, C. B. M. Ill, D. R. Chakrabarti, and M. L. Scott. Dali: A Periodically Persistent Hash Map. In International Symposium on Distributed Computing, vol. 91, pp. 37:1-37:16, 2017.
S. Pelley, P. M. Chen, and T. F.Wenisch. Memory Persistency. In International Symposium on Computer Architecture, 2014.
J. Ren, J. Zhao, S. Khan, J. Choi, Y. Wu, and O. Mutlu. ThyNVM: Enabling software-transparent crash consistency in persistent memory systems. In International Symposium on Microarchitecture, 2015.
Rob Davis, Chet Douglas, Paul Grun, Tom Talpey. Persistent memory over fabrics. https://www.flashmemorysummit.com/English/Collaterals/Proceedings/2017/20170809_FR22_Davis.pdf. 2017.
Y. Shan, S. Tsai, and Y. Zhang. Distributed shared persistent memory. In ACM Symposium on Cloud Computing, pp. 323-337, 2017.
D. B. Strukov, G. S. Snider, D. R. Stewart, and R. S.Williams. The missing memristor found. Nature, 2008.
A. S. Tanenbaum and H. Bos. Modern operating systems. Prentice Hall Press, 4th edition, 2014.
S. Venkataraman, N. Tolia, P. Ranganathan, and R. H. Campbell. Consistent and durable data structures for non-volatile byte-addressable memory. In USENIX Conference on File and Storage Technologies, 2011.
H. Volos, A. J. Tack, and M. M. Swift. Mnemosyne: Lightweight persistent memory. In International Conference on Architectural Support for Programming Languages and Operating Systems, 2011.
C. A. Waldspurger, N. Park, A. Garthwaite, and I. Ahmad. Efficient MRC construction with SHARDS. In USENIX conference on File and Storage Technologies, pp. 95-110, Feb. 2015.
J. Xu and S. Swanson. Nova: A log-structured file system for hybrid volatile/non-volatile main memories. In USENIX Conference on File and Storage Technologies, pp. 323-338, 2016.
J. Xu, L. Zhang, A. Memaripour, A. Gangadharaiah, A. Borase, T. B. D. Silva, S. Swanson, and A. Rudoff. Novafortis: A fault-tolerant non-volatile main memory file system. In ACM Symposium on Operating Systems Principles, pp. 478-496, 2017.
Y. Zhang, J. Yang, A. Memaripour, and S. Swanson. Mojim: A reliable and highly-available non-volatile memory system. In International Conference on Architectural Support for Programming Languages and Operating Systems, pp. 3-18, 2015.

* cited by examiner

APPLICATION FAULT TOLERANCE VIA BATTERY-BACKED REPLICATION OF VOLATILE STATE

CROSS-REFERENCES TO RELATED APPLICATIONS

The present application claims priority to U.S. Provisional Patent Application No. 62/578,323, filed Oct. 27, 2017, entitled "Crash Consistent Persistent Memory Replication and Battery-Backed Virtual Machine Availability."

In addition, the present application is related to the following commonly-owned U.S. Patent Applications, filed concurrently herewith:
- U.S. patent application Ser. No. 15/881,379 entitled "Application High Availability via Application-Transparent Battery-Backed Replication of Persistent Data"; and
- U.S. patent application Ser. No. 15/881,514 entitled "Application High Availability via Crash-Consistent Asynchronous Replication of Persistent Data."

The entire contents of the foregoing provisional and nonprovisional applications are incorporated herein by reference for all purposes.

BACKGROUND

In computing, the term "availability" refers to the percentage of time for which an entity (e.g., system, component, application, etc.) is accessible to consumers of that entity (e.g., end-users, other systems/components/applications, etc.) in a performant way. "High availability" is a goal that seeks to maximize availability and thus minimize downtime of the entity.

One known approach for achieving high availability for applications, referred to herein as "HA," leverages the fact that application storage is often shared among servers (i.e., host systems) in a cluster. If a failure on one host system in the cluster causes an application to stop running, HA detects the outage and automatically restarts (i.e., fails over) the application on another host system in the cluster that has access to the application's persistent data via the shared storage. A significant advantage of this approach is that it has no impact on the application's performance during normal operation. However, the application's volatile state on the original host system is lost during the fail-over and is recreated on the new host system; thus, any non-committed transactions at the point of failure are aborted. Further, the fail-over time for HA (which requires restarting the application on the new host system) is not instantaneous and can potentially take several seconds or minutes.

Another known approach for achieving high availability for applications, referred to herein as "fault tolerance" or "FT," involves the use of a pair of host systems: a primary host system on which an FT-protected application runs and a secondary host system that maintains an exact copy of the application. As the application executes on the primary host system, its volatile state is synchronized in a lockstep fashion to the copy on the secondary host system. This ensures that the secondary copy remains identical to the primary application and can take over for the primary application at any time. The main advantages of FT over HA are that the fail-over time is near instantaneous and no application state information is lost as a result of the fail-over. However, these advantages come with significant performance and runtime overhead costs, which include (1) the CPU and network overhead needed to synchronize the primary and secondary host systems and (2) stalls that are incurred by the primary application each time its state information is copied to the secondary host system.

SUMMARY

Techniques for implementing application fault tolerance via battery-backed replication of volatile state are provided. In one set of embodiments, a primary host system can detect a failure that causes an application of the primary host system to stop running. In response to detecting the failure, the primary host system can replicate volatile state that is used by the application to a secondary host system, where the secondary host system maintains a copy of the application, and where execution of the application is failed over to the copy on the secondary host system using the replicated volatile state.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof 1. Overview Embodiments of the present disclosure provide techniques for implementing application fault tolerance (FT) via battery-backed replication of volatile state. These techniques leverage the fact that many host systems have, or can be easily modified to include, a battery which can power critical components of the system for some period of time after a power-related failure. Assuming such a battery is in place on a primary host system, the techniques described herein enable the primary host system to copy (i.e., replicate) some, or all of an application's volatile state (e.g., RAM contents, virtual device state, etc.) to a secondary host system for FT purposes after the primary host system has failed (since the primary host system will be able to run for a while post-failure on battery power, if needed). This, in turn, allows the application to be failed over to the secondary host system in a manner that has less performance and overhead cost than HA, but allows the application's volatile state to be preserved after the fail-over.

According to one set of embodiments, an operating system (OS) or Basic Input/Output System (BIOS) of the primary host system can detect when a failure at the primary host system has occurred and, in response to the failure, can copy the entirety of the application's volatile state to the secondary host system. This approach assumes that the primary host system's battery has sufficient capacity to power critical components of the system (in the case of power-related failure) while the volatile state is transmitted to the secondary host system.

According to another set of embodiments, the OS or BIOS can proactively pre-copy dirty portions of the application's volatile state to the secondary host system before a failure occurs. The OS/BIOS can perform this pre-copying asynchronously, such that the application continues running in an uninterrupted fashion on the primary host system (i.e., is not stalled) while the volatile state is pre-copied to the secondary host system. Then, when a failure occurs on the primary host system, the OS or BIOS can copy any remaining portions of the application's volatile state to the secondary host system while the primary host system runs on battery power (if needed), thereby ensuring that the secondary application copy is fully synchronized with the primary application.

The foregoing and other aspects of the present disclosure are described in further detail below.

2. System Architecture

Figure 1:
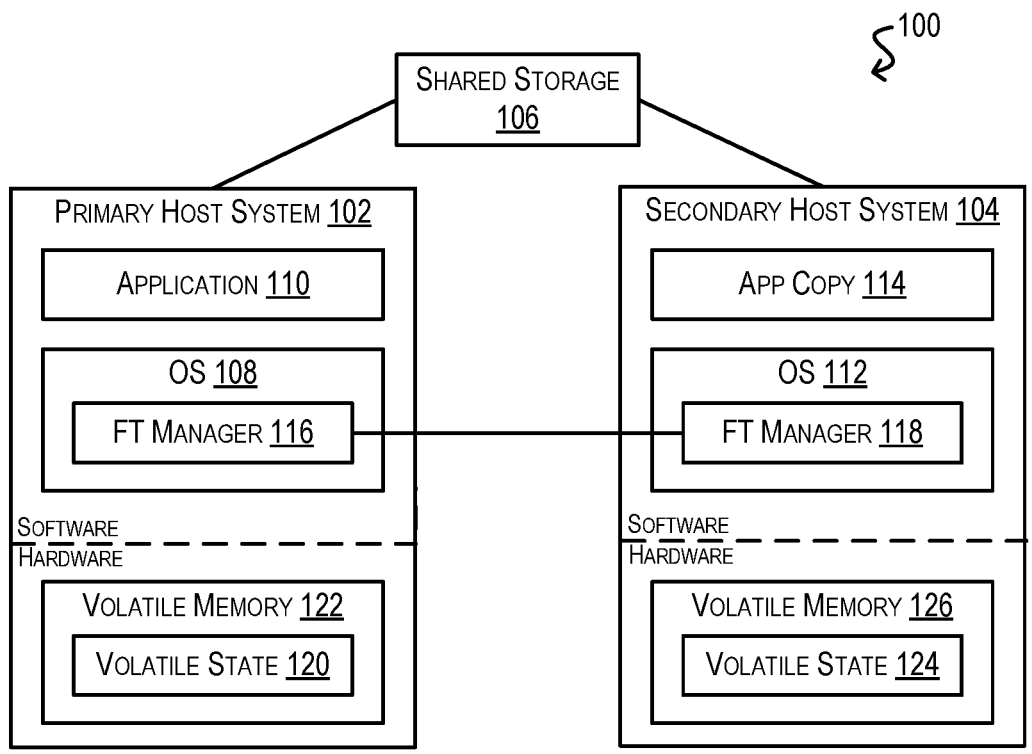
FIG. 1 depicts a system architecture that supports traditional application FT.

To provide context for the embodiments described herein, FIG. 1 depicts a simplified block diagram of a system architecture 100 that implements traditional application FT. As shown, architecture 100 includes a primary host system 102, a secondary host system 104, and a shared storage component 106. Primary host system 102 includes an OS 108 and an FT-protected application 110 that is configured to write persistent data to shared storage 106. Secondary host system 104 includes an OS 112 and a copy, or replica, 114 of application 110. OSs 108 and 112 can be conventional "bare-metal" OSs (e.g., Linux, Windows, etc.) or virtualization hypervisors (e.g., ESXi, Hyper-V, etc.). Similarly, application 110 can be a conventional software application or a virtual machine (VM).

Within OSs 108 and 112, host systems 102 and 104 further include FT managers 116 and 118 respectively, which are interconnected to form a distributed system. These FT managers are responsible for carrying out a traditional FT workflow between host systems 102 and 104. For example, when FT is first turned on for application 110, FT managers 116 and 118 can coordinate to migrate the volatile state of application 110 (shown via reference numeral 120 in volatile memory 122) from primary host system 102 to secondary host system 104, thereby creating an initial instance of secondary copy 114 and corresponding volatile state 124 in volatile memory 126.

Then, for every X number of I/Os (or other events that result in an externally visible change in state) issued by application 110, FT manager 116 of primary host system 102 can stall application 110, complete the I/Os/events, take a checkpoint of application 110 (which includes the application's volatile state at that point and any virtual device state, if present), and transfer the checkpoint to FT manager 118 of secondary host system 104. In response, FT manager 118 can apply this checkpoint information on secondary copy 114 (thereby synchronizing volatile state 124 of secondary copy 114 with volatile state 120 of primary application 110) and can return an acknowledgement to FT manager 116. Upon receiving the acknowledgement, FT manager 116 can resume application 110 and send acknowledgments to the application indicating completion of the X I/Os. This process can subsequently repeat for each group of I/Os issued by application 110, thereby ensuring that secondary copy 114 remains in synchrony with application 110 throughout the runtime of the application 110.

As noted in the Background section, while traditional FT is useful in that it preserves the volatile state of an application after fail-over and provides for significantly lower fail-over times than traditional HA, it incurs a significant amount of CPU/network overhead for synchronizing checkpoint information between the primary and secondary host systems. It also undesirably stalls the application on the primary host system each time that checkpoint information needs to be replicated to the secondary host system.

Figure 2:
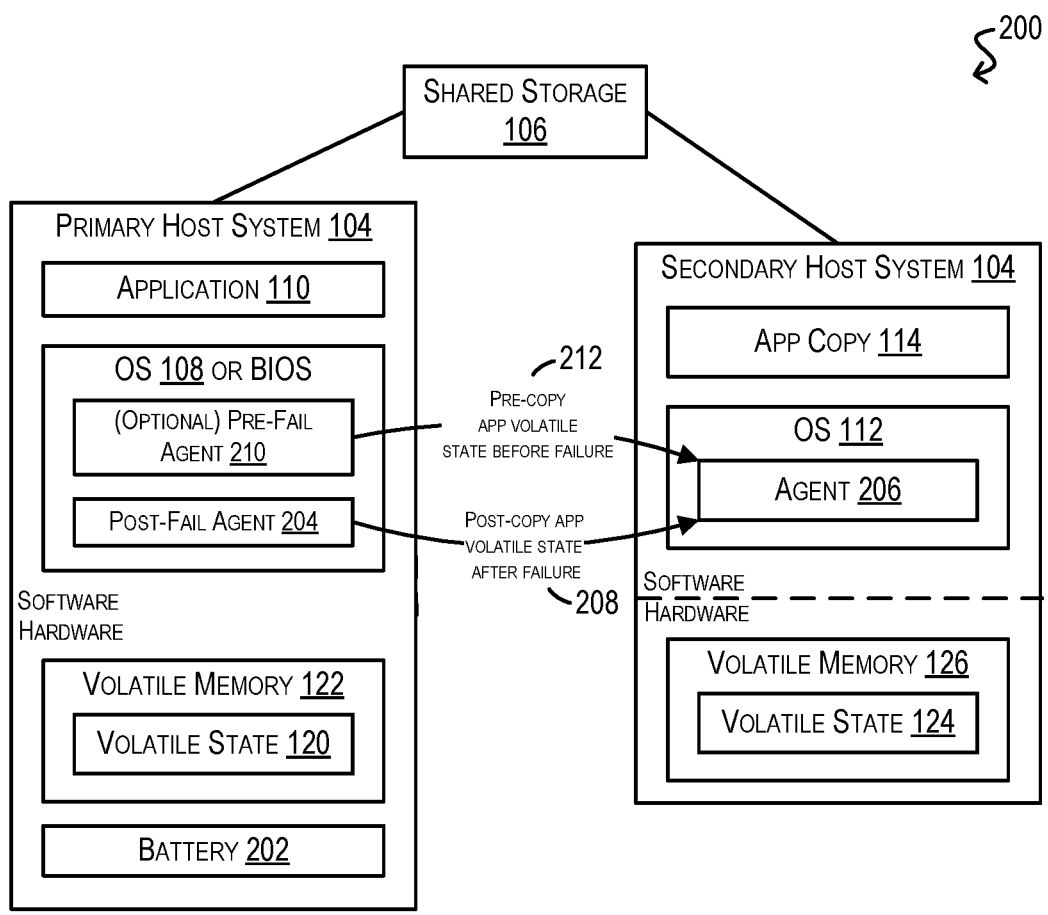
FIG. 2 depicts a system architecture for achieving application FT via battery-backed replication of volatile state according to an embodiment.

To solve these and other similar problems, FIG. 2 depicts a system architecture 200 that reflects an improved approach for implementing application FT according to embodiments of the present disclosure. This approach, referred to as "battery-backed replication of volatile state," assumes that primary host system 102 is modified to include a battery 202 that can power critical components of system 102 (e.g., CPU, volatile memory, network interface) in cases where system 102 loses AC power. Battery 202 can take many different forms, such as an on-board battery (as found on certain types of persistent memory modules), an uninterruptible power supply (UPS), a commodity battery (e.g., laptop battery), and so on.

The approach/architecture of FIG. 2 further assumes that the failure(s) experienced by primary host system 102 are of a type that allows system 102 to briefly execute some "panic" code post-failure. Examples of failures that allow for panic execution include crashes resulting from device driver/OS/firmware bugs (which can be handled by the OS or BIOS), uncorrectable memory errors (which also can be handled by the OS or BIOS), and AC power loss (which can be addressed for a limited period of time via battery 202). This approach is not specifically designed to handle host failures where critical system components are destroyed or rendered completely inoperable; such unrecoverable failures require alternative availability techniques that are orthogonal to the embodiments of present disclosure, such as backups, geo-replication, and other disaster-tolerant solutions.

As shown in FIG. 2, a novel post-fail agent 204 implemented in OS 108 or the BIOS of primary host system 102 can, upon the occurrence of a host failure, replicate the contents of application volatile state 120 to a corresponding agent 206 on secondary host system 104. This process, referred to as "post-copying" and shown via arrow 208, can be executed as part of the panic code of primary host system 102, possibly with the aid of battery 202. In response to receiving volatile state 120, agent 206 can apply it to volatile state 124 of secondary copy 114. In this way, secondary copy 114 can be synchronized with primary application 110 for FT purposes, without incurring any overhead or performance impact during the runtime of application 110.

A couple of potential issues with post-copying the entirety of volatile state 120 to secondary host system 104 at the point of failure is that the amount of volatile state may be very large, and/or the amount of network bandwidth between primary host system 102 and secondary host system 104 may be limited. If either or both of these factors are true, the post-copy phase can potentially take a while to complete, which may exceed the length of system uptime supported by battery 202.

To address this, as shown in FIG. 2, OS 108 or the BIOS of host system 102 can also implement an optional pre-fail agent 210. In cases where pre-fail agent 210 is present/enabled, pre-fail agent 210 can track and asynchronously "pre-copy," to agent 206 of secondary host system 104, portions of volatile state 120 that are modified during runtime of application 110, before a host failure occurs (arrow 212). If application 110 writes data to volatile state 120 too quickly (e.g., such that the amount of dirty data in volatile state 120 exceeds a threshold), pre-fail agent 210 may temporarily throttle the application. However, pre-fail agent 210 generally will not take checkpoints of application 110 during its runtime, and thus will not stall application 110 for checkpointing purposes.

Then, when a failure occurs, post-fail agent 204 can take a single checkpoint of application 110 and transfer this single checkpoint (along with any remaining dirty data in volatile state 120) to agent 206 of secondary host system 104. With this pre-copying, the time needed to complete the post-copy phase (which should only comprise copying the single checkpoint and the remaining dirty data in volatile state 120 that was not copied during the pre-copy phase) can be advantageously reduced.

It should be noted that the foregoing pre-copy approach is intended to apply to power failures or other failures in which the original system kernel on primary host system 102 remains intact, since in these cases a checkpoint of application 110 (comprising the application's virtual device state) can be taken post-failure. In scenarios where the kernel is corrupted or otherwise rendered inoperable at the time of failure, an alternative pre-copy approach may be taken in which pre-fail agent 210 takes multiple checkpoints of application 110 during application runtime but does not synchronize this checkpoint information to secondary host system 104 pre-failure; instead, the checkpoint information is transferred post-failure. This alternative approach is discussed in Section 4.1 below.

In the following sections, additional details are provided regarding the approach/architecture of FIG. 2, as well as various complexities and considerations pertaining to this design. It should be appreciated that FIG. 2 is illustrative and not intended to limit the embodiments of the present disclosure. For example, although battery 202 is shown as being an integral part of primary host system 102, in some embodiments battery 202 may be implemented in a separate enclosure that is coupled with primary host system 102, such as an external battery or UPS.

Further, although only a single application 110 is shown as running on primary host system 102, multiple applications (each with their own volatile state) may be supported by the FT techniques described herein.

Yet further, although FIG. 2 assumes that the persistent data of application 110 is maintained on shared storage 106 (and thus is accessible to secondary copy 114 on secondary host system 104), in some embodiments this persistent data may be maintained on storage or persistent memory that is solely local to primary host system 102. In these cases, the persistent data may be replicated to secondary host system 104 using battery-backed techniques that are described in co-pending U.S. Patent Application Nos. Ser. No. 15/881,379 and Ser. No. 15/881,514, which are incorporated herein by reference for all purposes. Alternatively, if the persistent data is maintained in local storage, primary host system 102 may simply replicate every write I/O to secondary host system 104 in a synchronous manner, without using a battery-backed technique. One of ordinary skill in the art will recognize other variations, modifications, and alternatives.

3. Workflow With Pre-Copying Disabled

Figure 3:
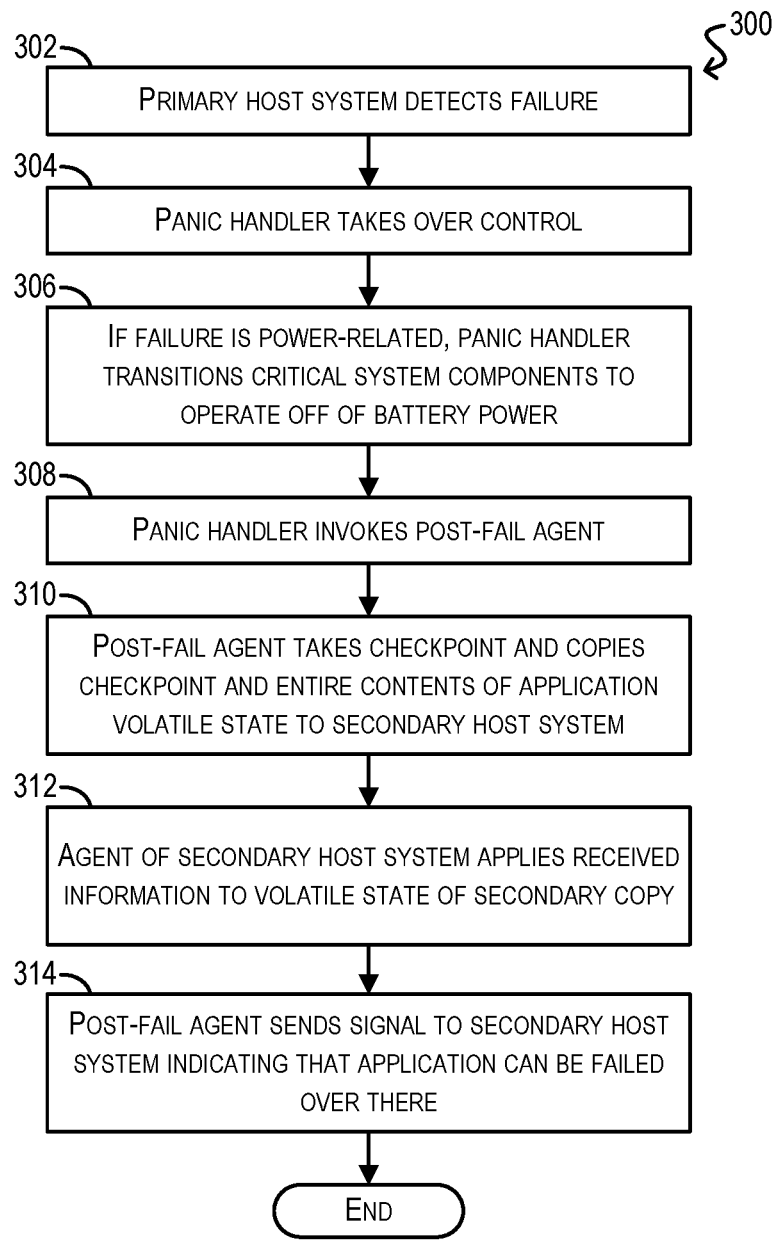
FIG. 3 depicts a workflow for implementing battery-backed replication of volatile state with pre-copying disabled according to an embodiment.

FIG. 3 depicts a workflow 300 that can be executed by post-fail agent 204 of FIG. 2 for implementing battery-backed replication of volatile state for application 110 with pre-copying disabled according to an embodiment. In this workflow, it is assumed that pre-fail agent 210 is not present or is disabled and thus the entirety of application 110's volatile state 120 is replicated after a host failure occurs (i.e., during the post-copy phase). This embodiment works well in cases where the size of volatile state 120 is relatively small, which limits the amount of time needed to complete the post-copy phase. This embodiment can also be useful in cases where there are limited system resources in the deployment environment of application 110, since there is no need to have a secondary host system in place during the runtime of application 110 to receive pre-copy updates (secondary host system 104 only needs to be identified and made available at the time of failure).

Starting with block 302, primary host system 102 can detect the occurrence of a failure that prevents application 110 from continuing its execution. Examples of such failures include, e.g., a loss of AC power, an OS-level crash, a "hard" crash caused by, e.g., an uncorrectable memory error, and a system shutdown initiated by a hard press of the system's power button.

At blocks 304 and 306, a panic handler module in the OS or BIOS of primary host system 102 that is configured to handle the failure can take over control and, if the failure is power-related, can transition certain critical components of system 102 (e.g., CPU, volatile memory, network interface) to operate on power provided by battery 202. The panic handler module can then invoke post-fail agent 204 (block 308). As part of this step, in certain embodiments the panic handler module may shut down the existing instance of the OS kernel and replace it with a minimal and more robust kernel (possibly single-threaded and with few device drivers) using a mechanism such as kexec.

Upon being invoked, post-fail agent 204 can take a checkpoint of volatile state 120 of application 110 and copy the entire contents of this state (as captured in the checkpoint) to agent 206 of secondary host system 104 (block 310). Volatile state 120 can include, e.g., the volatile memory allocated to application 110, as well as other non-persistent information pertaining to application 110 (e.g., virtual device state if application 110 is a VM). The specific communication channel that is used for this copying can differ depending on the nature of the deployment. For example, in one set of embodiments, a network channel/protocol such as remote direct memory access (RDMA) may be used.

At block 312, in response to receiving volatile state 120, agent 206 of secondary host system 104 can apply the received state information to volatile state 124 of secondary copy 114, thereby synchronizing state 124 with state 120.

Finally, once the entirety of volatile state 120 has been successfully copied to secondary host system 104, post-fail agent 204 can send a signal to agent 206 indicating that the application can be failed over to secondary host system 104 (block 314) and workflow 300 can end. In some embodiments, post-fail agent 204 may alternatively send this signal at an earlier point in time so that secondary host system 104 can begin running secondary copy 114 as the "primary" version of the application before all of the dirty data in volatile state 120 has been copied over (discussed in section 6 below).

4. Workflow With Pre-Copying Enabled (Kernel Intact after Failure)

Figure 4:
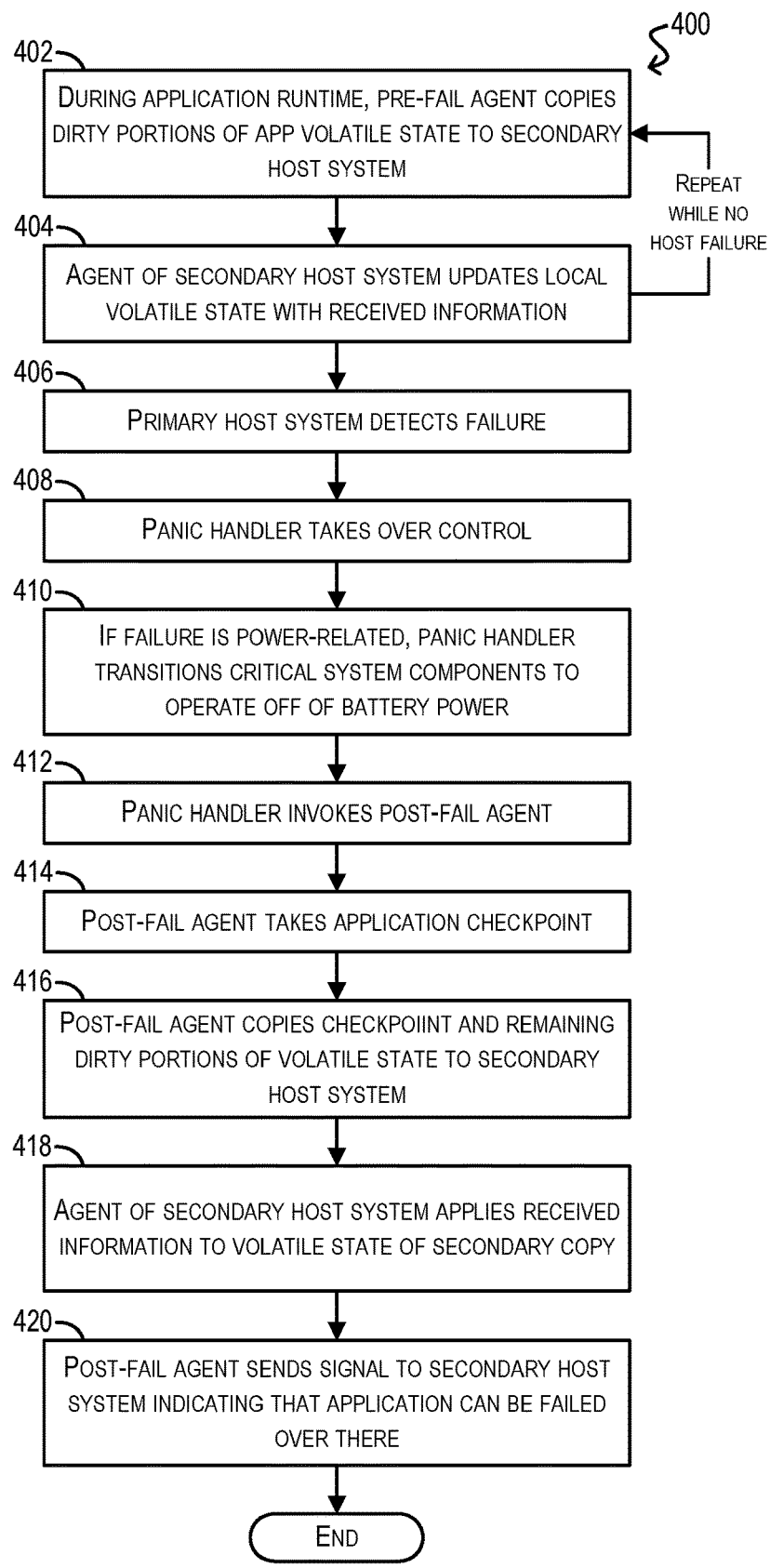
FIG. 4 depicts a first workflow for implementing battery-backed replication of volatile state with pre-copying enabled according to an embodiment.

FIG. 4 depicts a workflow 400 that can be executed by pre-fail agent 210 and post-fail agent 204 of FIG. 2 for implementing battery-backed replication of volatile state for application 110 with pre-copying enabled according to an embodiment. As mentioned previously, pre-copying is useful for cases where volatile state 120 is large and/or the network bandwidth between primary host system 102 and secondary host system 104 is limited, since it reduces the total amount of data that needs to be replicated by post-fail agent 204 during the post-copy phase. This in turn reduces the length of time needed to complete the post-copying and can establish a limit on both (1) the maximum downtime for application 110 and (2) the maximum required capacity for battery 202. Workflow 400 assumes that the failure experienced by primary host system 102 is a power failure or other similar failure in which the system kernel remains intact (which allows an application checkpoint to be taken post-failure).

Starting with block 402, during runtime of application 110, pre-fail agent 210 can copy dirty portions of volatile state 120 to secondary host system 104 that are not yet present there (this is referred to as the pre-copy phase). Pre-fail agent 210 can perform this copying in an asynchronous fashion while application 110 is running normally (i.e., while there is no host failure).

In response to receiving the dirty data from pre-fail agent 210, agent 206 of secondary host system 104 can update volatile state 124 with the received data, thereby synchronizing volatile state 124 with volatile state 120 (block 404).

It should be noted that since a main goal of the pre-copying performed by pre-fail agent 210 is to limit the amount of dirty data that needs to be replicated during the post-copy phase, in certain embodiments agent 210 may throttle application 110 as part of block 402 if the number of dirty pages in volatile state 120 that have not yet been copied to secondary host system 104 exceeds, or grows close to, a predefined limit (referred to as the "dirty page limit"). Further, since pre-fail agent 210 is implemented at the OS or BIOS level, agent 210 does not have direct knowledge of how the data in volatile state 120 is updated by application 110. Accordingly, in these embodiments, pre-fail agent 210 can implement some method of "dirty page tracking" to determine when the amount of dirty data in volatile state 120 reaches, or approaches, the dirty page limit. Various possible techniques for implementing these mechanisms are discussed in section 5 below.

At block 406, primary host system 102 can detect the occurrence of a failure that prevents application 110 from continuing its execution. In response, primary host system 102 can carry out a series of steps that are substantially similar to blocks 304-308 of workflow 300 (i.e., appropriate panic handler module takes over control (408), transitions critical system components to operate on power provided by battery 202 (410), and invokes post-fail agent 204 (412)).

Upon being invoked, post-fail agent 204 can take a single checkpoint of application 110 that includes, e.g., the application's virtual device state if applicable (block 414). Post-fail agent 204 can then copy, to agent 206 of secondary host system 104, the checkpoint and the remaining dirty portions of volatile state 120 that were not copied by pre-fail agent 210 during the pre-copy phase of block 402 (block 416).

At block 418, in response to receiving the checkpoint and remaining portions of dirty data, agent 206 of secondary host system 104 can apply the received data to volatile state 124 of secondary copy 114, thereby synchronizing state 124 with state 120.

Finally, at block 420, post-fail agent 204 can send a signal to agent 206 indicating that the application can be failed over to secondary host system 104 (in a manner similar to block 314 of workflow 300) and workflow 400 can end. As in workflow 300, post-fail agent 204 can alternatively send this signal at an earlier point in so that secondary host system 104 can begin running secondary copy 114 as the primary version of the application before all of the remaining dirty data has been copied over.

4.1 Workflow With Pre-Copying Enabled (Kernel Corrupted after Failure)

Figure 5:
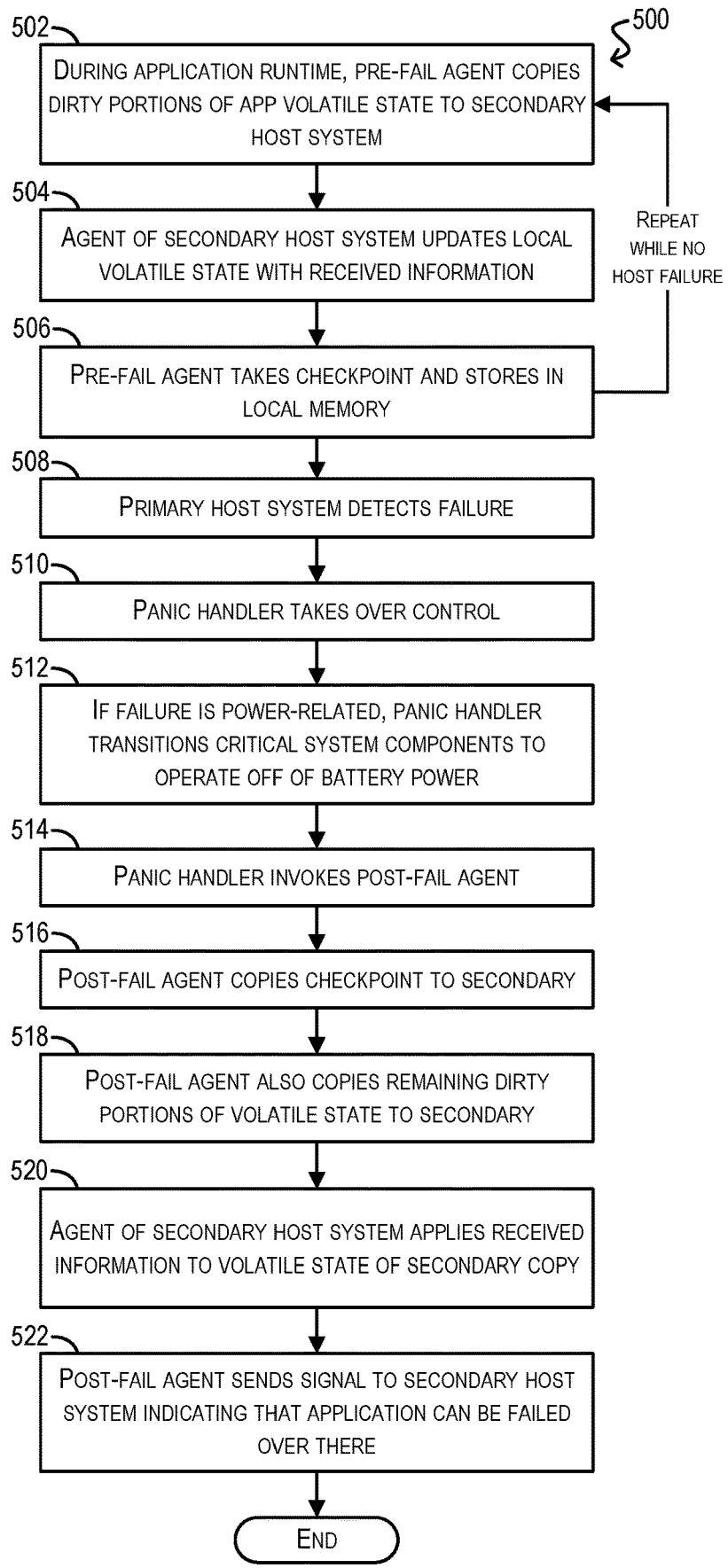
FIG. 5 depicts a second workflow for implementing battery-backed replication of volatile state with pre-copying enabled according to an embodiment.

As mentioned previously, workflow 400 of FIG. 4 works well if the failure experienced by primary host system 102 is one that keeps the system kernel intact/operational post-failure. This is because the kernel must be operational in order for post-fail agent 204 to take an application checkpoint per block 414 of FIG. 4. In cases where primary host system 102 experiences a failure that corrupts the kernel (such as a hard crash resulting from an uncorrectable memory error), an alternative pre-copying approach may be used that involves taking checkpoints during application runtime but delaying the transfer of checkpoint information to secondary host system 104 until after the failure has occurred. This approach is shown in FIG. 5 as workflow 500 according to an embodiment.

At blocks 502 and 504, during runtime of application 110, pre-fail agent 210 can copy dirty portions of volatile state 120 to secondary host system 104 that are not yet present there in a manner that is similar to blocks 402 and 404 of workflow 400. However, in addition to these steps, pre-fail agent 210 can periodically take a checkpoint of application 110 that captures the application's virtual device state (if the application is a VM) and save this checkpoint in local memory (block 506). Each time a new checkpoint is taken, pre-fail agent 210 can overwrite the previous checkpoint. Further, in the time period between any two checkpoints (referred to as a checkpoint "epoch"), pre-fail agent 210 can maintain a copy of the data in volatile state 120 that is overwritten during that time period.

Note that pre-fail agent 210 does not transfer any checkpoint information to secondary host system 104 during application runtime; it simply stores the checkpoints in memory.

At block 508, primary host system 102 can detect the occurrence of a failure that prevents application 110 from continuing its execution. In response, primary host system 102 can carry out a series of steps that are substantially similar to blocks 408-412 of workflow 400 (i.e., appropriate panic handler module takes over control (510), transitions critical system components to operate on power provided by battery 202 if needed (512), and invokes post-fail agent 204 (514)).

Upon being invoked, post-fail agent 204 can copy the most recent checkpoint of application 110 to agent 206 of secondary host system 104 (block 516). Post-fail agent 204 can also copy the remaining dirty portions of volatile state 120 that were not copied by pre-fail agent 210 during the pre-copy phase (block 518). If some of the dirty portions of volatile state 120 were written after the checkpoint copied at block 516 was taken, post-fail agent 204 can instead copy the previous versions of that data (i.e., versions from the previous checkpoint epoch) to agent 206.

At block 520, in response to receiving the checkpoint and remaining portions of dirty data, agent 206 of secondary host system 104 can apply the received data to volatile state 124 of secondary copy 114, thereby synchronizing state 124 with state 120.

Finally, at block 522, post-fail agent 204 can send a signal to agent 206 indicating that the application can be failed over to secondary host system 104 (in a manner similar to block 420 of workflow 400) and workflow 500 can end. As in workflow 400, post-fail agent 204 can alternatively send this signal at an earlier point in so that secondary host system 104 can begin running secondary copy 114 as the primary version of the application before all of the remaining dirty data has been copied over.

5. Application Throttling and Tracking Dirty Pages

As discussed above, in some embodiments pre-fail agent 210 may throttle application 110 during its runtime in order to keep the number of dirty pages in volatile state 120 that have not yet been replicated to secondary host system 104 below a predefined dirty page limit. As used herein, "throttling" an application refers to temporarily pausing, or stalling, execution of the application.

There are a number of ways in which this throttling can be implemented. For example, in one set of embodiments, pre-fail agent 210 can stall application 110 once the dirty page limit is reached, transmit a small amount of dirty data to secondary host system 104, and then let application 110 resume execution while further dirty data is replicated to secondary host system 104 in the background. If the application dirty rate is higher than the network bandwidth between primary host system 102 and secondary host system 104, pre-fail agent 210 will stall application 110 once again once the dirty page limit is reached, and this process will repeat in the steady state while application 110 continues running. To optimize this, in certain embodiments pre-fail agent 110 can attempt to identify the "heat" of each memory page in volatile state 120, where "heat" is a metric that indicates how often the page is dirtied. Pre-fail agent 110 can then prioritize the copying of cold memory pages to secondary host system 104 to avoid repeatedly sending over hot memory pages.

In another set of embodiments, a low and high watermark for the dirty page limit can be defined. When the low watermark is reached, pre-fail agent 210 can introduce a small throttling delay to application 110, and this delay can be gradually increased as the high watermark is approached.

As for dirty page tracking, there various techniques which pre-fail agent 210 can use to track the amount of volatile memory that is dirtied by application 110 during the pre-copy phase. A few of these techniques are described below.

Page faults—with this technique, pages in volatile memory are marked as read-only; when application 110 writes to a page, this causes a page fault which can be detected by pre-fail agent 210. Unfortunately, this technique is expensive from a performance perspective since a page fault can consume thousands of CPU cycles, clears the execution pipeline, and disrupts data fetching logic.

Dirty bit in page table entries—Modern processors support dirty page tracking by recording a dirty bit in a page's entry in the system's page tables, with minimal overhead. Accordingly, with this technique, pre-fail agent 210 can periodically traverse the page table tree to determine the number of pages that have their dirty bit set. Further, once a given page has been copied, its dirty bit can be cleared.

This dirty bit technique is generally more efficient than page faults, but incurs an overhead of traversing the page table tree, clearing dirty bits, and invalidating TLB entries. Further, since dirty pages cannot be detected until after they have already been written to, this technique makes it difficult to control the application's dirty rate (i.e., rate at which it writes to memory).

Page modification logging—In addition to marking page-level dirty bits in the page tables, modern processors can also record modified pages in a log (known as the page modified list, or PML) stored in volatile memory. A log entry is added to the PML every time a clean page is written to.

(i.e., every time X amount of data is written, where X corresponds to page size). Thus, by examining the PML, pre-fail agent 210 can track which pages are dirtied.

Application notification—With this technique, application 110 can be configured to notify the system OS (and thus pre-fail agent 210) when its volatile state is modified. This technique is the most precise tracking method, but requires the application to be explicitly designed to support it.

6. Fast Start

In some embodiments, application 110 can be failed over from primary host system 102 to secondary host system 104 even before all of the dirty data in volatile state 120 is propagated to secondary host system 104. In these cases, paging can be used if the failed-over application (i.e., copy 114) needs a missing memory page that has not yet been replicated from primary host system 104. For example, if secondary copy 114 (which is now the primary) faults on a missing page, it can specifically request that page on-demand from primary host system 102.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing application fault tolerance via battery-backed replication of volatile state, the method comprising:
   detecting, by a primary host system, an AC power failure that causes an application of the primary host system to stop running;
   in response to detecting the AC power failure, transitioning, by a panic handler module implemented in an operating system (OS) or Basic Input/Output System (BIOS) of the primary host system, a CPU, a volatile memory component, and a network interface of the primary host system to operate on battery power provided by an internal battery;
   invoking, by the panic handler module, a post-fail agent implemented in the OS or the BIOS; and
   while the CPU, the volatile memory component, and the network interface of the primary host system are operating on the battery power:
      taking, by the post-fail agent, a checkpoint of a volatile state of the application, the checkpoint including volatile memory allocated to the application and a virtual device state of the application;
      replicating, by the post-fail agent the volatile state captured via the checkpoint from the volatile memory component of the primary host system to a volatile memory component of a secondary host system; and
      transmitting, by the post-fail agent to an agent running on the secondary host system, a signal to begin running a secondary copy of the application on the secondary host system using the replicated checkpoint.

2. The method of claim 1 wherein the AC power failure causes a kernel of the primary host system to become corrupted or inoperable.

3. The method of claim 2 further comprising, prior to detecting the AC power failure:
   copying, by a pre-fail agent implemented in the OS or the BIOS, portions of the volatile state that are dirtied by the application during application runtime to the secondary host system;
   taking, by the primary host system, checkpoints of the application on a periodic basis; and
   storing the checkpoints in a local memory of the primary host system.

4. The method of claim 3 further comprising, in response to the detecting:
   copying the checkpoints to the secondary host system.

5. The method of claim 1 further comprising, prior to detecting the AC power failure:
   copying, by a pre-fail agent implemented in the OS or the BIOS, portions of the volatile state that are dirtied by the application during application runtime to the secondary host system, without taking any checkpoints of the application.

6. The method of claim 1 wherein the post-fail agent replicates the volatile state of the application from the volatile memory component of the primary host system to the volatile memory component of the secondary host system using remote direct memory access (RDMA).

7. The method of claim 1 wherein the post-fail agent transmits the signal to the agent running on the secondary host system before the volatile state of the application has been completely replicated from the volatile memory component of the primary host system to the volatile memory component of the secondary host system.

8. A non-transitory computer readable storage medium having stored thereon program code executable by a primary host system, the program code embodying a method for implementing application fault tolerance via battery-backed replication of volatile state, the method comprising:
   detecting an AC failure that causes an application of the primary host system to stop running;
   in response to detecting the AC power failure, transitioning, by a panic handler module implemented in an operating system (OS) or Basic Input/Output System (BIOS) of the primary host system, a CPU, a volatile memory component, and a network interface of the primary host system to operate on battery power provided by an internal battery;
   invoking, by the panic handler module, a post-fail agent implemented in the OS or the BIOS; and
   while the CPU, the volatile memory component, and the network interface of the primary host system are operating on the battery power:
      taking, by the post-fail agent, a checkpoint of a volatile state of the application, the checkpoint including volatile memory allocated to the application and a virtual device state of the application;
      replicating, by the post-fail agent the volatile state captured via the checkpoint from the volatile memory component of the primary host system to a volatile memory component of a secondary host system; and
      transmitting, by the post-fail agent to an agent running on the secondary host system, a signal to begin running a secondary copy of the application on the secondary host system using the replicated checkpoint.

9. The non-transitory computer readable storage medium of claim 8 wherein the AC power failure causes a kernel of the primary host system to become corrupted or inoperable.

10. The non-transitory computer readable storage medium of claim 9 wherein the method further comprises, prior to detecting the AC power failure:

copying, by a pre-fail agent implemented in the OS or the BIOS, portions of the volatile state that are dirtied by the application during application runtime to the secondary host system;

taking checkpoints of the application on a periodic basis; and storing the checkpoints in a local memory of the primary host system.

11. The non-transitory computer readable storage medium of claim 10 wherein the method further comprises, in response to the detecting:

copying the checkpoints to the secondary host system.

12. The non-transitory computer readable storage medium of claim 8 wherein the method further comprises, prior to detecting the AC power failure:

copying, by a pre-fail agent implemented in the OS or the BIOS, portions of the volatile state that are dirtied by the application during application runtime to the secondary host system, without taking any checkpoints of the application.

13. The non-transitory computer readable storage medium of claim 8 wherein the post-fail agent replicates the volatile state of the application from the volatile memory component of the primary host system to the volatile memory component of the secondary host system using remote direct memory access (RDMA).

14. The non-transitory computer readable storage medium of claim 8 wherein the post-fail agent transmits the signal to the agent running on the secondary host system before the volatile state of the application has been completely replicated from the volatile memory component of the primary host system to the volatile memory component of the secondary host system.

15. A primary host system comprising:
a central processing unit (CPU);
a battery;
a volatile memory component;
a network interface;
an operating system (OS);
a Basic Input/Output System (BIOS); and
a non-transitory computer readable medium having stored thereon program code for implementing application fault tolerance via battery-backed replication of volatile state, the program code causing the primary host system to:
detect an AC power failure that causes an application of the primary host system to stop running;
in response to detecting the AC power failure, transition, via a panic handler module implemented in the OS or the BIOS, the CPU, the volatile memory component, and the network interface to operate on battery power provided by the battery;
invoke, via the panic handler module, a post-fail agent implemented in the OS or the BIOS; and
while the CPU, the volatile memory component, and the network interface are operating on the battery power:
take, via the post-fail agent, a checkpoint of a volatile state of the application, the checkpoint including volatile memory allocated to the application and a virtual device state of the application;
replicate, via the post-fail agent the volatile state captured via the checkpoint from the volatile memory component of the primary host system to a volatile memory component of a secondary host system; and
transmit, via the post-fail agent to an agent running on the secondary host system, a signal to begin running a secondary copy of the application on the secondary host system using the replicated checkpoint.

16. The primary host system of claim 15 wherein the AC power failure causes a kernel of the primary host system to become corrupted or inoperable.

17. The primary host system of claim 16 wherein the program code further causes the primary host system to, prior to detecting the AC power failure:

copy, by a pre-fail agent implemented in the OS or the BIOS, portions of the volatile state that are dirtied by the application during application runtime to the secondary host system;

take checkpoints of the application on a periodic basis; and store the checkpoints in a local memory of the primary host system.

18. The primary host system of claim 17 wherein the program code further causes the primary host system to, in response to detecting the AC power failure:

copy the checkpoints to the secondary host system.

19. The primary host system of claim 15 wherein the program code further causes the primary host system to, prior to detecting the AC power failure:

copy, by a pre-fail agent implemented in the OS or the BIOS, portions of the volatile state that are dirtied by the application during application runtime to the secondary host system, without taking any checkpoints of the application.

20. The primary host system of claim 15 wherein the post-fail agent replicates the volatile state of the application from the volatile memory component of the primary host system to the volatile memory component of the secondary host system using remote direct memory access (RDMA).

21. The primary host system of claim 15 wherein the post-fail agent transmits the signal to the agent running on the secondary host system before the volatile state of the application has been completely replicated from the volatile memory component of the primary host system to the volatile memory component of the secondary host system.

* * * * *